US007228616B2

(12) United States Patent
Stephens

(10) Patent No.: US 7,228,616 B2
(45) Date of Patent: Jun. 12, 2007

(54) SYSTEM AND METHOD FOR MAGNETIZATION OF PERMANENT MAGNET ROTORS IN ELECTRICAL MACHINES

(75) Inventor: Charles Michael Stephens, Pattersonville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/094,910

(22) Filed: Mar. 31, 2005

(65) Prior Publication Data

US 2006/0220484 A1 Oct. 5, 2006

(51) Int. Cl.
*H02K 1/28* (2006.01)
*H02K 21/12* (2006.01)
*H01F 13/00* (2006.01)

(52) U.S. Cl. .............. 29/598; 310/156.31; 310/156.43; 310/261

(58) Field of Classification Search ................ 310/261, 310/156.43, 156.31, 43; 29/598, 596
See application file for complete search history.

(56) References Cited

U.S. PATENT DOCUMENTS 6,542,348 B1 * 4/2003 Stupak, Jr. .................. 361/147

FOREIGN PATENT DOCUMENTS

GB 2299217 A * 9/1996
JP 2004072820 A * 3/2004

OTHER PUBLICATIONS

Gieras et al., "Permanent Magnet Motor Technoloty Design and Applications, Second Edition, Revised and Expanded," 2002, Marcel Dekker, Inc., p. 87.*
Translation of JP200407282A. Translated by: FLS, Inc.*

* cited by examiner

*Primary Examiner*—Darren Schuberg
*Assistant Examiner*—David W. Scheuermann
(74) *Attorney, Agent, or Firm*—Fletcher Yoder

(57) ABSTRACT

A system and method for manufacturing an electrical machine is provided. An array of permanent magnet segments is assembled around a rotor spindle. Desired orientation directions of the permanent magnet segments are determined. The assembled permanent magnet segments are then positioned in a magnetization fixture such that the desired orientation directions of the permanent magnet segments are aligned with corresponding flux directions of the magnetizing fixture.

13 Claims, 6 Drawing Sheets

SYSTEM AND METHOD FOR MAGNETIZATION OF PERMANENT MAGNET ROTORS IN ELECTRICAL MACHINES

BACKGROUND

The invention relates generally to electrical machines, particularly to electrical machines having permanent magnet type rotors. Specific embodiments of the present technique relate to a system and method for magnetization of permanent magnet segments in such rotors.

An electrical machine, such as a motor or a generator, generally includes a rotor disposed within a stator and utilized to convert electrical power to mechanical power or vice versa. Certain electrical machines use permanent magnet type rotors, which reduce the size and enhance the overall efficiency of the machine. Such a rotor generally includes an annular permanent magnet, disposed over a rotor spindle. In certain embodiments, the permanent magnet is a monolithic, hollow, cylindrical member. In larger machines, the permanent magnet is generally formed by assembling a plurality of permanent magnets assembled around a rotor spindle. High speed electrical machines may also include a holding ring or a retaining ring around the permanent magnet assembly to prevent fracturing and scattering of the permanent magnet assembly by centrifugal forces.

Generally, the permanent magnet segments are magnetized prior to assembly on the rotor spindle. For example, the permanent magnet segments are cut and ground to shape from larger unfinished magnet blocks, after which the segments are magnetized individually in a solenoid coil. In certain applications, especially in larger machines, magnetization of the permanent magnet segments is achieved via a magnetization vector proposed by K. Halbach (also known as Halbach magnetization), which, when applied to the surface of the permanent magnets, results in a more sinusoidal shaped flux distribution within the electrical machine, thereby reducing AC harmonic losses and reducing torque ripple, vibration and acoustic noise. The permanent magnet segments are subsequently adhesively bonded to the rotor spindle.

However, assembly of the rotor from pre-magnetized permanent magnet segments may be a cumbersome process, especially in larger electrical machines, as it may be time consuming and unwieldly. The process can involve substantial forcing and aligning by mechanical devices to position and restrain the energized permanent magnet segments. The process is prone to physical accidents if energized permanent magnet blocks escape restraint.

Accordingly, there exists a need for a simpler and efficient technique for magnetization of the permanent magnet segments in electrical machine rotors.

BRIEF DESCRIPTION

The present technique accordingly provides a novel approach toward magnetizing permanent magnet segments in rotors of electrical machinery. Briefly, in accordance with one aspect of the present technique, a method of manufacturing an electrical machine is provided. The method includes assembling an array of permanent magnet segments around a rotor spindle of the electrical machine. Desired orientation directions are determined for the permanent magnet segments. The method further includes positioning the assembled permanent magnet segments in a magnetization fixture such that the desired orientation directions of the permanent magnet segments are aligned with corresponding flux directions of the magnetizing fixture.

Further aspects of the present technique provide an electrical machine manufactured in accordance with the above-described method.

DRAWINGS

These and other features, aspects, and advantages of the present invention will become better understood when the following detailed description is read with reference to the accompanying drawings in which like characters represent like parts throughout the drawings, wherein.

Figure 3:
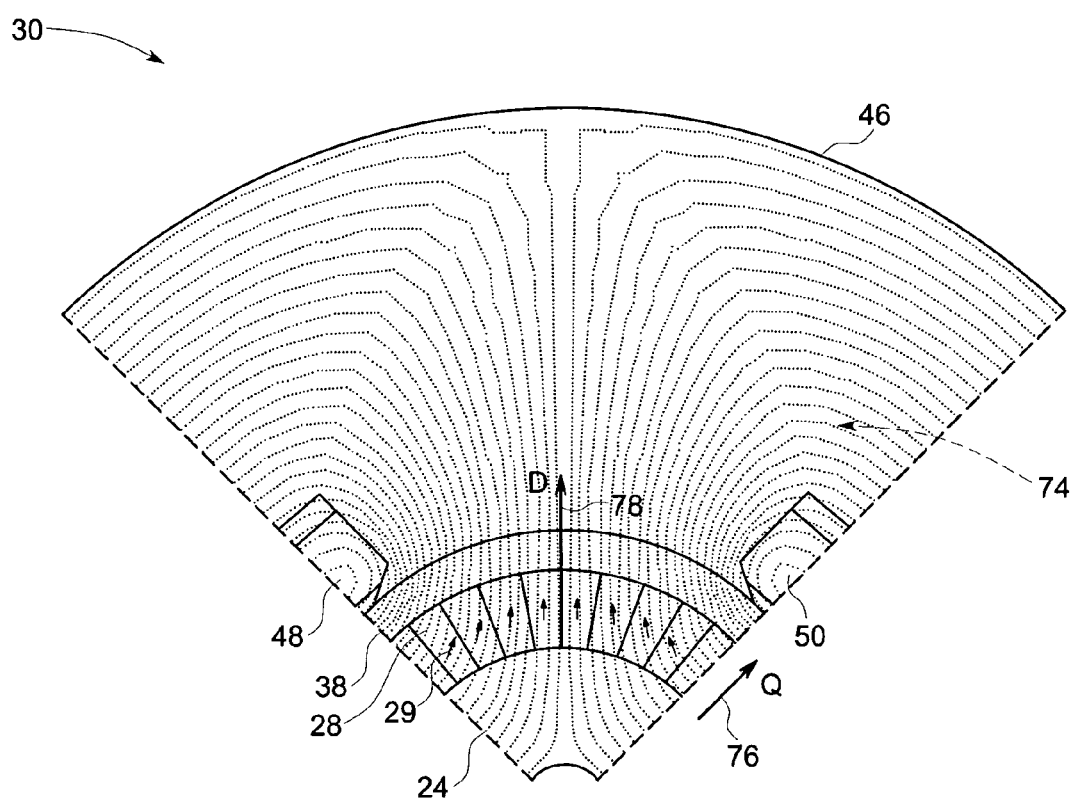

FIG. 3 schematically illustrates the desired orientation of the permanent magnet segments with respect to the magnetization directions of the magnetic flux of the magnetizing fixture.

Figure 4:
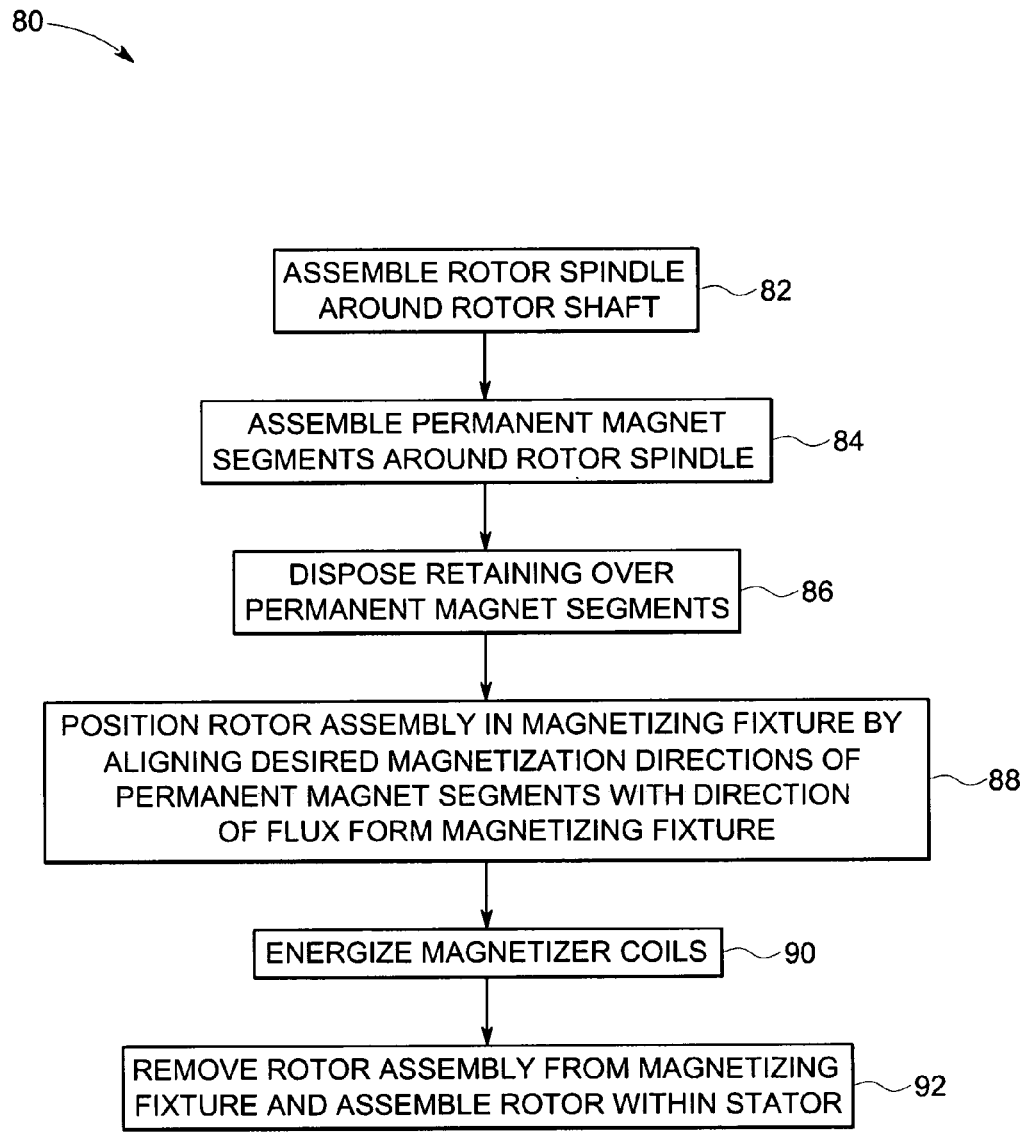
Figure 5:
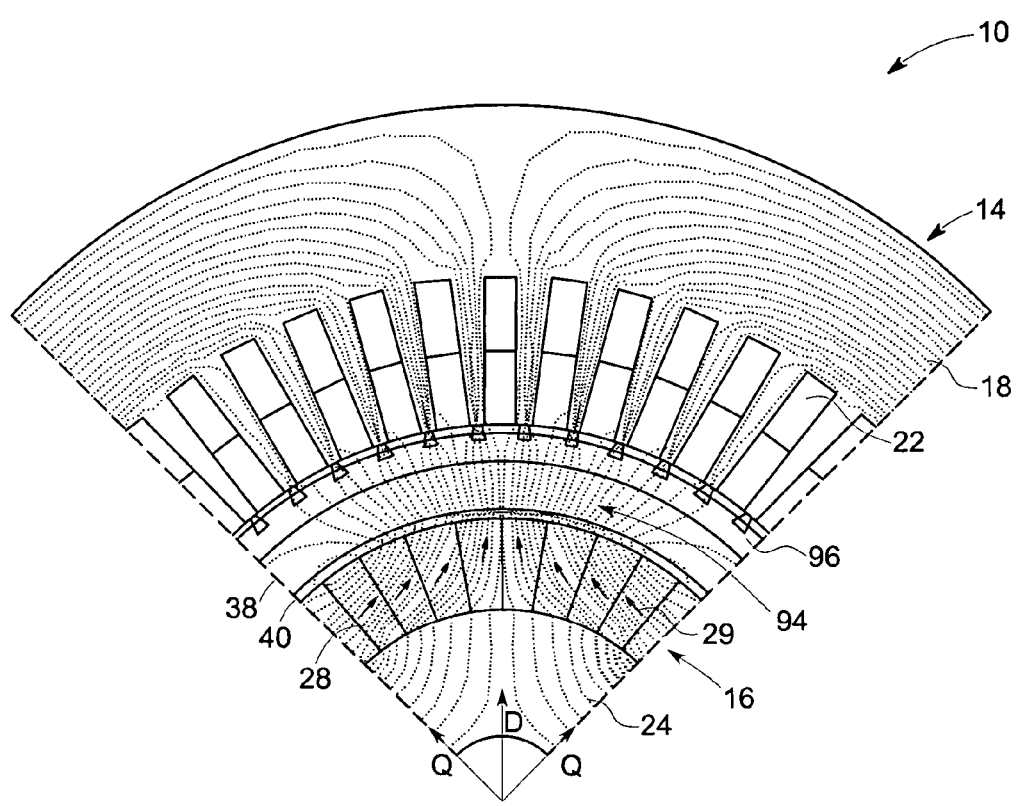
Figure 6:
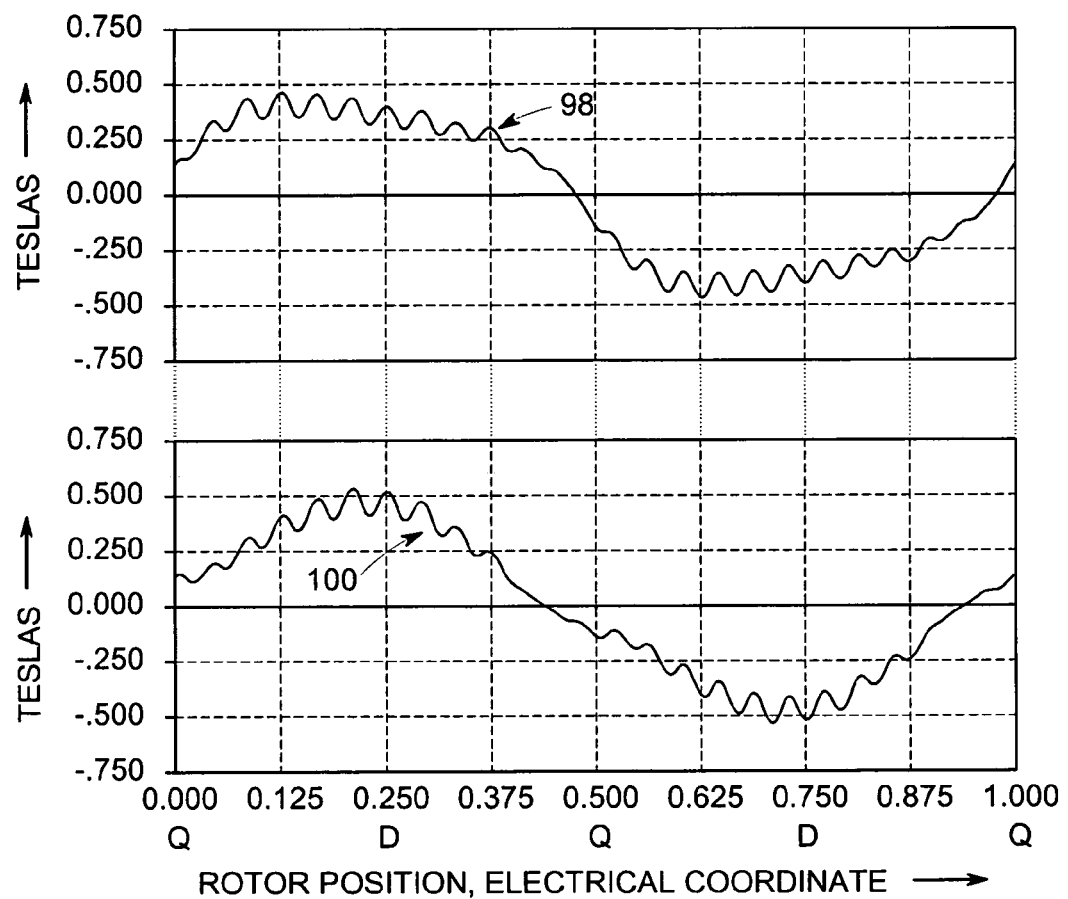

FIG. 4 is a flowchart illustrating an exemplary method of manufacturing a rotor of an electrical machine according to aspects of the present techniques;

FIG. 5 is a schematic illustration of flux distribution in a motor or generator having a rotor magnetized by aspects of the present technique; and FIG. 6 is a comparative illustration of rated load electromagnetic characteristics for rotors having radial orientation and Halbach orientation of permanent magnets thereof.

DETAILED DESCRIPTION

The present technique provides a system and method for magnetizing permanent magnet segments in an electrical machine rotor. In accordance with one aspect of the present technique, each pole of the rotor magnet comprises a Halbach array of permanent magnet segments. The present technique provides for a one-step magnetization of an entire assembled rotor in a multipole magnetizing fixture, in such a manner as to obtain optimal magnetization of the oriented magnets. Specific embodiments of the present technique are illustrated hereinafter with reference to FIGS. 1–6.

Figure 1:
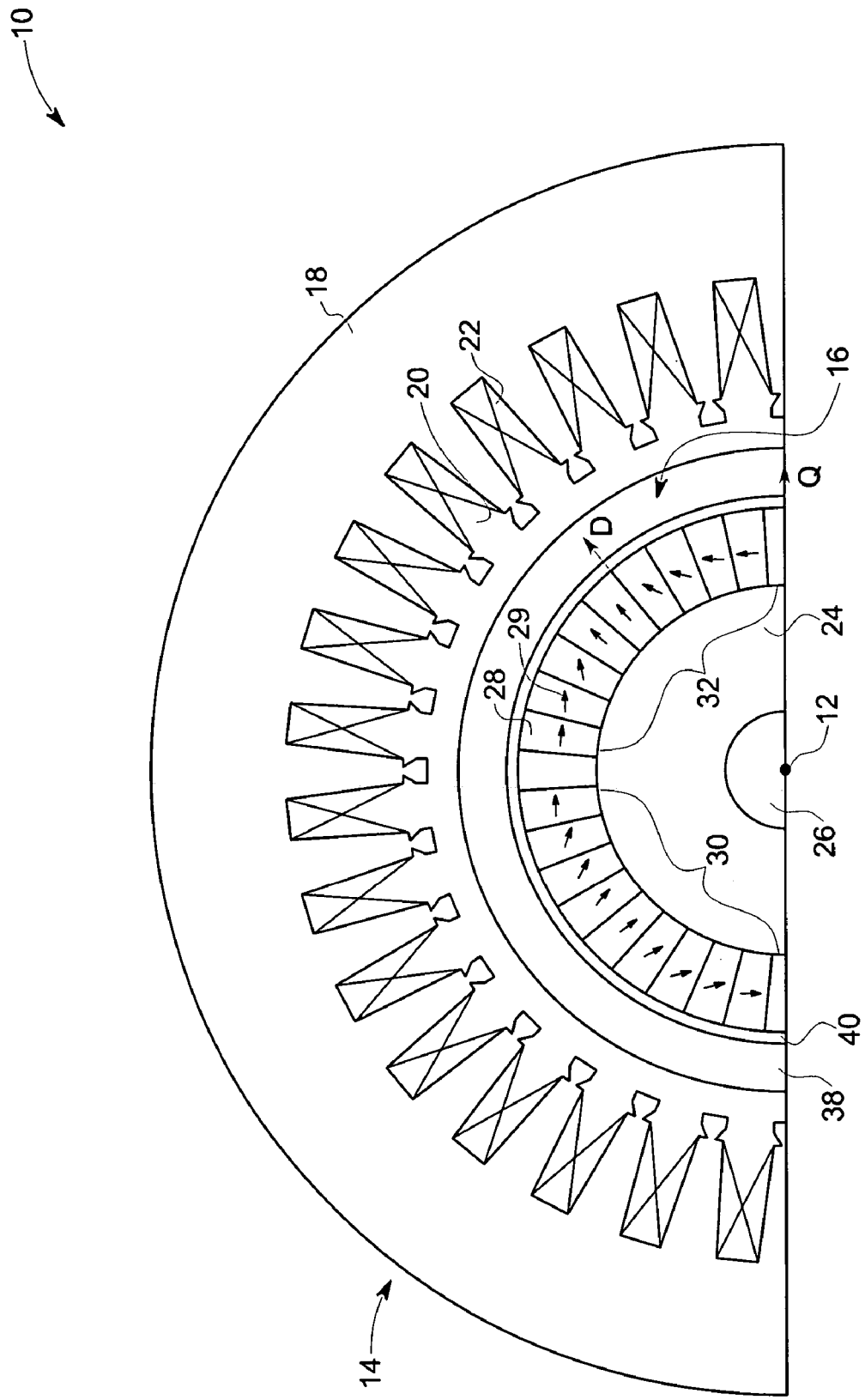
FIG. 1 illustrates an electrical machine having a permanent magnet type rotor produced in accordance with the present techniques.

Referring now to FIG. 1, there is illustrated an exemplary portion of an electrical machine 10, wherein aspects of the present technique are incorporated. The electrical machine 10 may include, for example a polyphase synchronous electrical motor or generator. FIG. 1 shows a cross-sectional view taken in direction perpendicular to a rotary axis of 12 the electrical machine 10.

The electrical machine 10 comprises a stator 14 and a rotor 16. The stator 14 includes a laminated stator core 18, generally formed from electromagnetic steel sheets. Slots 20 are formed on the stator core 18 to accommodate stator windings 22. The rotor 16 is disposed within the stator 14 so as to permit rotation around the rotary axis 12 while being supported by bearings (not shown). The rotor 16 includes a rotor spindle 24 mounted on a shaft 26. In certain embodiments, the shaft 26 may be formed integral to the rotor spindle 24. In one embodiment, the rotor spindle 24 and the shaft 26 are formed from a ferromagnetic material.

The rotor 16 of the illustrated embodiment is a permanent magnet type rotor including an annular array of permanent magnet segments 28 disposed over the rotor spindle 24. The arrows 29 illustrate the unique orientation direction of each of the permanent magnet segments 28. The orientation direction is the direction that a permanent magnet obtains its strongest magnetization, and it is imparted to the magnet segments during its manufacture as individual segments. Cross-sectional shapes of the permanent magnet segments 28 may include an arcuate shape, as illustrated in FIG. 1, or may include other suitable shapes, such as a generally trapezoidal, polygonal or a triangular shape. The permanent magnet segments 28 may be formed from any ferrite series, NdFeB series, Sm—Co series, SmFeN series, among any others that possess an oriented characteristic. The orientation of a permanent magnet material is created by applying a magnetic field while the material is pressed in a soft, wet condition. The orientation of shaped segment may be established by orienting a shaped press mold to the applied magnetic field, or by cutting the shaped segment appropriately from a larger finished block of known orientation direction. The permanent magnet segments 28 may be adhesively bonded or sintered to the rotor spindle 24. In the illustrated embodiment, the rotor 16 includes four poles 30, 32, 34, 36 (34 and 36 not shown in FIG. 1), each pole being constituted by eight permanent magnet segments 28. In the illustrated embodiment, a retaining ring 38 is disposed around the permanent magnet segments 28 to secure the permanent magnet segments 28 against centrifugal forces caused by rotation of the rotor 16. Retaining ring 38 may be formed from carbon fibers or from a high-strength metal. An electromagnetic shield 40 may be desirable in arrangements in which the retaining ring 32 has a non-metallic composition.

In accordance with one aspect of the present technique, the permanent magnet segments 28 of the rotor 16 form a Halbach array (i.e. obtained by Halbach magnetization discussed above) to produce a more sinusoidal shaped flux distribution within the electrical machine 10. This reduces AC harmonic losses, resulting in consequently reduced torque ripple, vibration and acoustic noise. In the Halbach array, the orientation direction 29 of each permanent magnet segment 28 is such that the direction 29 is nearly tangential to the direction of rotation of the rotor at a quadrature axis (hereinafter referred to as a Q-axis) of each rotor pole 30, 32, 34 and 36, and is nearly normal to the rotation direction at a direct axis (hereinafter referred to as a D-axis) of each of the rotor poles 30, 32, 34 and 36. The D-axis may be defined as the location in a magnetic pole wherein the magnetic field is most strongly radially directed, and whereas the Q-axis generally corresponds to the location in the magnetic pole wherein the magnetic field is most strongly peripherally directed. It should be noted that although the Q and D axes of a magnetic pole differ electrically by 90 degrees, their relative physical locations depend on the geometry and number of poles of the rotor. For example, in a four-pole rotor, the Q and D axes of each pole are angularly separated by about 45 degrees.

Figure 2:
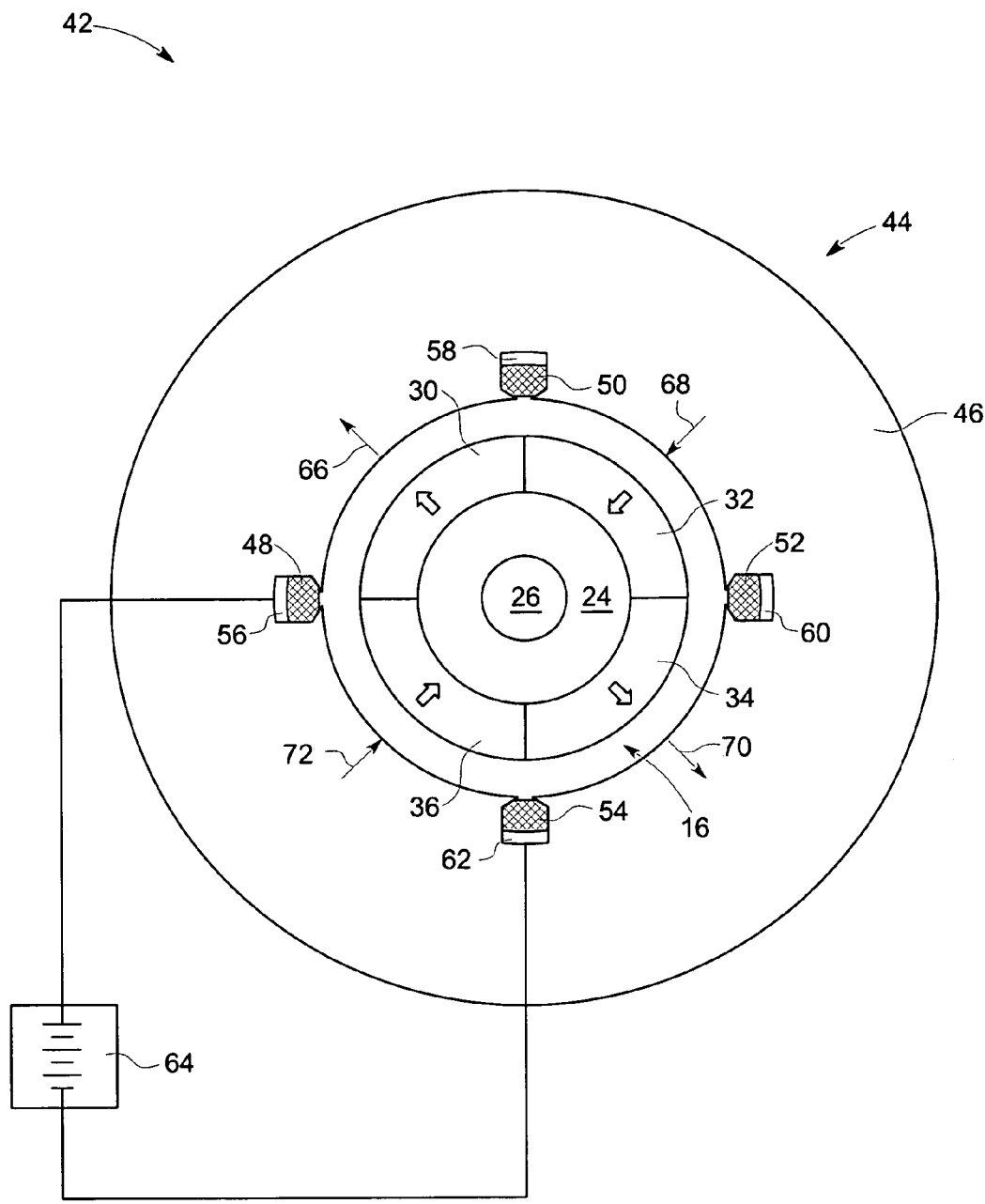
FIG. 2 illustrates a rotor magnetization apparatus in accordance with aspects of the present technique.

FIG. 2 illustrates a magnetization apparatus 42 in accordance with aspects of the present technique. The magnetization apparatus 42 includes a multipole magnetizing fixture 44 within which the rotor 16 is securely positioned for magnetization of the permanent magnet segments 28 (FIG. 1). The magnetizing fixture 44 comprises magnetizing coils wound around a magnetizer core or yoke 46. The number of magnetizing coils is generally chosen to be equal to the number of poles of the rotor. Accordingly, in the illustrated embodiment, the fixture 44 includes four coils 48, 50, 52 and 54 accommodated in slots 56, 58, 60 and 62 provided on the magnetizer core 46. In accordance with the present technique, the rotor 16 is positioned within the fixture 44 in such a way that the Q axes of the rotor poles 30, 32, 34 and 36 are aligned with the magnetizing coils 48, 50, 52 and 54 respectively. The coils 48, 50, 52 and 54 are energized by a power source 64. The power source 64 is desirably a pulsed DC power source in order to reduce the duration of current flowing through the coils. The coils 48, 50, 52 and 54 may be coupled to the power source 64 in series, as illustrated in FIG. 2, or in parallel. When energized, the magnetizing coils 48, 50, 52 and 54 produce a magnetic flux through magnetizer poles 66, 68, 70, 72, the centers (or D-axes) of which are coincident with the D-axes of the rotor poles 30, 32, 34 and 36, and through the permanent magnet segments 28.

The orientations 29 of the magnet segments 28 are determined a priori by magnetic analysis, such as by finite element method. The orientations are located with respect to the segment physical shape during manufacture of the permanent magnet segments. These orientations may be marked, for example by paint, on individual permanent magnet segments to facilitate the assembly process. FIG. 3 schematically illustrates the orientations 29 of the permanent magnet segments 28 with respect to the magnetic flux 74 of the magnetizing fixture 44, magnetic flux 74 being calculated by finite element method. FIG. 3 illustrates orientations for segments in the pole 30 of the rotor 16. In the illustrated embodiment, the magnetization direction 29 for each segment 28 corresponds to a Halbach orientation as discussed above. As illustrated in the figure, the orientation directions 29 of the individual permanent magnet segments 28 are such as to be nearly coincident in direction with the magnetic flux 74 produced by the energized magnetizing coils. Further, as illustrated, the magnetic orientation of the permanent magnet segments are progressively swept from being nearly tangential at a rotor pole Q-axis 76 to being nearly normal at a rotor pole D-axis 78.

FIG. 4 is a flowchart illustrating an exemplary process 80 for manufacturing an electrical machine in accordance with certain embodiments of the present technique. The process begins by assembling a rotor spindle around a shaft, as indicated at block 82. As discussed earlier, in certain embodiments, the shaft may be formed integral to the rotor spindle. At block 84 the permanent magnet segments are assembled around the rotor spindle. In one embodiment, theses segments are adhesively bonded to each other and to the rotor spindle. A retaining ring may be disposed around the permanent magnet segments, as indicated at block 86. The process then proceeds at block 88 by positioning the rotor assembly within a magnetizing fixture. As explained earlier, block 88 includes aligning magnetization directions of the permanent magnet segments with the direction of flux from the magnetizing fixture. The magnetizing coils are then energized by a power source, as indicated at bock 90. Once the permanent magnet segments are magnetized, the rotor assembly is removed from the magnetizing fixture and is assembled within the stator (block 92). As will be appreciated by those skilled in the art, the process 80 may be implemented by a fully automated assembly line, semi-automatically, or even manually.

FIG. 5 is an illustration of exemplary flux distribution in the resulting magnetized rotor 16. The permanent magnet segments produce a magnetic flux 94, which is linked to the stator core 18 to produce rotational torque on the rotor 16. Torque produced on the rotor is dependent, among other factors, on the shape of the flux distribution at an air gap 96 between the stator 14 and the rotor 16. As illustrated, the flux 94 produced by the magnetized rotor is oriented along the magnetization direction of the permanent magnet segments 28, which varies from being generally tangential at the rotor pole Q-axes to being generally normal at the rotor pole D-axis. Hence, as can be seen, the flux density (i.e. magnetic flux per unit area) is radially directed at the rotor pole D-axis and is peripherally directed at the rotor pole Q-axes. This results in a more sinusoidal distribution of density of the magnetic flux 94 the air gap 96 than magnetic flux produced by segments having entirely radial magnetization direction. The above is best illustrated in FIG. 6, wherein curve 98 is a graphical representation of rated load electromagnetic characteristics for a rotor having radial magnetization orientation and curve 100 depicts the same for a rotor having Halbach orientation of permanent magnets. FIG. 6 shows the variation flux density (in Tesla) in the air gap 96, represented along a Y-axis, with position of the rotor (in electrical coordinates), represented along an X-axis. It should be understood that the electrical coordinates are represented as a fraction of 180 electrical degrees, which, in the illustrated embodiment corresponds to an angular separation of 180 degrees. As can be seen the flux density distribution of a Halbach magnetized rotor is substantially more sinusoidal as compared to that of a radially magnetized rotor.

The present technique may thus facilitate magnetization of a electrical machine rotor in a one-step process, thus obviating the need to assemble the rotor from pre-magnetized blocks, which may be cumbersome and difficult as discussed earlier. The resulting magnetized rotor produces a more sinusoidally shaped flux distribution within the electric machine. The present technique can be incorporated in a wide range of electrical machinery, including motors, and particularly including large high-speed synchronous machines for gas line compressors, aerospace motors, aerospace generators, marine propulsion motors, among others.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for manufacturing a rotor of an electrical machine, comprising:
   assembling an array of permanent magnet segments around a rotor spindle;
   determining desired orientation directions of the permanent magnet segments; and
   positioning the assembled permanent magnet segments in a magnetization fixture such that the desired orientation directions of the permanent magnet segments are aligned with corresponding flux directions of the magnetizing fixture,
   wherein the desired orientation directions of the permanent magnet segments are configured such that successive orientation directions vary from a direction generally normal to a direction of rotation of the rotor at a rotor pole D-axis to a direction generally tangential to the direction of rotation of the rotor at a rotor pole Q-axis, and
   wherein the desired orientation directions of the permanent magnet segments are determined via magnetic analysis comprising finite element method, generally having the characteristic that the desired orientation directions of the permanent magnet segments are such as to be nearly coincident in direction with the magnetic flux produced by the magnetizing fixture.

2. The method of claim 1, wherein the magnetizing fixture comprises a plurality of coils wound around a magnetic core, the coils of the magnetizing fixture being equal in number to the number of poles of the rotor.

3. The method of claim 2, further comprising aligning rotor pole Q axes with the coils of the magnetizing fixture and aligning rotor pole D axes with centers of magnetizer poles of the magnetizing fixture.

4. The method of claim 1, further comprising energizing the magnetizing fixture via a pulsed direct current (DC).

5. The method of claim 1, wherein the electrical machine comprises a polyphase synchronous machine.

6. The method of claim 1, wherein assembling the permanent magnet segments comprises adhesively bonding the permanent magnet segments to each other and to the rotor spindle.

7. The method of claim 1, further comprising disposing a retaining ring over the assembled permanent magnet segments.

8. A method for magnetizing a cylindrical machine element, comprising
   assembling an array of non-magnetized permanent magnet segments in a circular pattern;
   determining desired orientation directions of the non-magnetized permanent magnet segments, such that successive orientation directions vary from a direction generally normal to a direction of rotation of the rotor at a rotor pole D-axis to a direction generally tangential to the direction of rotation of the rotor at a rotor pole Q-axis;
   positioning the assembled non-magnetized permanent magnet segments in a magnetization fixture such that flux directions of the magnetizing fixture are generally aligned along the desired orientation directions of the permanent magnet segments; and
   energizing the magnetization fixture to magnetize the segments,
   wherein determining the desired orientation directions of the permanent magnet segments via magnetic analysis comprises using finite element method, generally having the characteristic that the desired orientation directions of the permanent magnet segments are such as to be nearly coincident in direction with the magnetic flux produced by the magnetizing fixture.

9. The method of claim 8, wherein the orientation directions of the permanent magnet segments are generally aligned with the direction of flux produced by the magnetizing fixture.

10. The method of claim 8, comprising assembling the non-magnetized permanent magnet segments on a rotor spindle prior to positioning the non-magnetized permanent magnet segments in the magnetization fixture.

11. The method of claim 8, wherein the magnetizing fixture comprises a plurality of coils wound around a magnetic core, the coils being equal in number to the number of poles of the rotor.

12. The method of claim 11, further comprising aligning rotor pole Q axes with the coils of the magnetizing fixture and aligning rotor pole D axes with centers of magnetizer poles of the magnetizing fixture.

13. The method of claim 11, wherein energizing the magnetizing fixture comprises subjecting the coils to a pulsed direct current (DC).

* * * * *